May 10, 1960
F. C. EMMICK ET AL
2,935,751
FLOTATION DEVICE
Filed Dec. 5, 1957
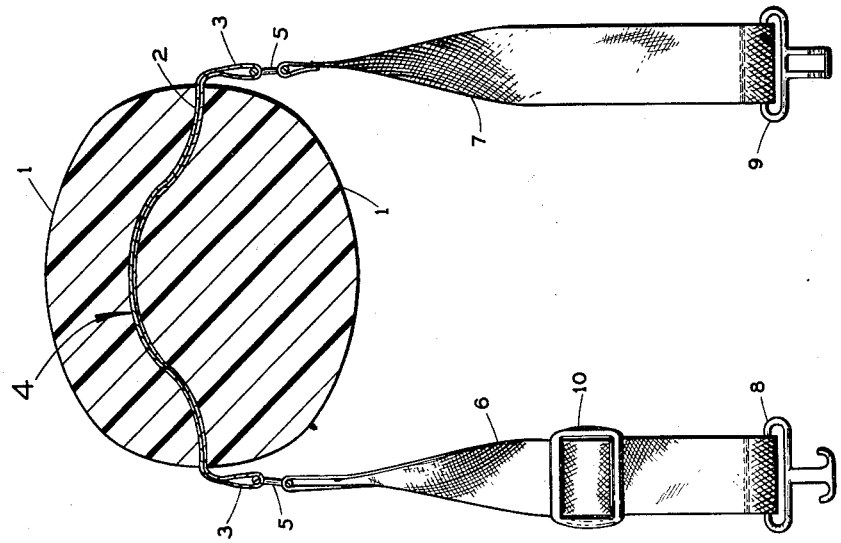
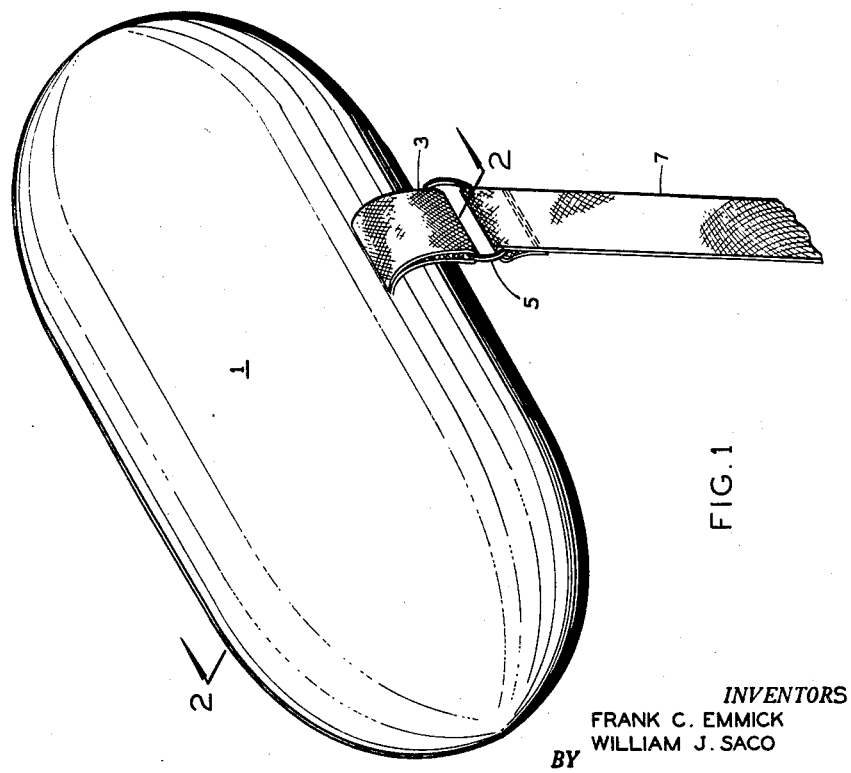
INVENTORS
FRANK C. EMMICK
WILLIAM J. SACO
BY

United States Patent Office 2,935,751
Patented May 10, 1960

2,935,751

FLOATATION DEVICE

Frank C. Emmick and William J. Saco, Hialeah, Fla., assignors to Caribbean Products Corp., a Florida company Application December 5, 1957, Serial No. 700,882

3 Claims. (Cl. 9—339)

This invention relates in general to marine floatation devices and more particularly to a device adapted to be secured to the human body to provide safe buoyancy thereto for bathing and swimming without encumbering the normal movements of the human body. The device has also other practical uses such as floats for fish nets, marine markers and like applications.

Floatation devices previous to this invention are of two general types, one requires inflation and/or sealing which inherently presents the problems of proper inflation and the hazard of deflation and leaking. The second type is dependent upon the use of low specific gravity materials, such as cork, kapok or like materials in casings. Such devices are subject to loss of buoyancy and resulting danger from water absorption and deterioration. Both previous types are usually constructed in the form of a jacket or like formation which greatly limits the normal movements of the user.

The present invention overcomes the above hazards, objections and disadvantages, by the provision of a molded plastic float of uniform low density, impervious to both fresh and salt water, resistant to wear, fracture and permanent deformation including a single belt means adapted to encircle the body for holding the float against the mid-portion of the back which is a principal object of the invention.

Another object of the invention is the provision of a molded plastic float ellipsoidal in shape in which an endless fastening member is molded therein for providing a pair of anchoring loops extending from opposite sides thereof.

Another object of the invention is the provision of a float made from foam type plastic expanded in a mold including a fastening means molded therein and extending from the surface thereof.

These and other objects and advantages in one embodiment of the invention are described and shown in the appended specification and drawing in which:

Fig. 1 is a perspective view of the floatation device.

Fig. 2 is a cross-sectional view taken through section line 2—2, Fig. 1.

Referring to Figs. 1 and 2, the float 1 is a general ellipsoidal body of homogeneous uniform density plastic material generally referred to as foam plastic which materials may be expanded in the cavity of a mold by thermal or chemical means. A typical material is an expandable polystyrene commercially available in small bead for under the trade name "Dylite." Another material suitable for this purpose is an isocyanate resin which may be foamed in a mold by the addition of a catalyst.

Using expandable polysytrene as a typical example, the present float may be thermally molded from beads into a homogeneous shape with a relatively smooth outer skin with densities ranging from two to five pounds per cubic foot as may be desired. Furthermore, the molded float is highly resistant to moisture and exhibits high resistance to abrasion and permanent deformation. When the float illustrated in the figures is made with a long dimension of approximately ten inches and a short dimension of approximately five and one-half inches, its volume will be approximately one-fourth cubic foot, which size is sufficient to provide safe buoyancy to an average person in water.

Referring to Fig. 2, a web-type strap 2, either woven endless or ends thereof stitched together, is molded into the float in a curvilinear path terminating in a pair of loops 3—3 projecting from opposite sides of the float. The curved path 4 of the parallel portions of the strap through the float greatly increases the bonded security of the projecting loops. This construction is particularly important when the float is required to be secured by one loop only.

Since one of the principal uses of the float is a safety aid for children during bathing and swimming instruction, the loops 3 are provided with a pair of metal rings 5—5 secured to each end of body straps 6 and 7 respectively. The opposite ends of said straps are adapted to be secured together by a safety buckle 8—9 and a conventional adjustment clip 10.

Thus when the strap is secured around the mid-section of the user and the float position substantially in the middle of the back, safe buoyancy is accomplished without restriction to the normal movements of the body and little resistance from the float is encountered during swimming because of its inherent shape and position on the body.

It is to be understood that the float shape and fastening means above described may be modified to suit different specific applications within the scope of the appended claims.

Having described our invention, we claim:

1. A floatation device comprising a molded homogeneous solid float of uniform low density substantially ellipsoidal in shape, an elongated endless strap with the mid-portion thereof molded therein and extending through said float in sealed relation forming a pair of open loops extending from opposite sides thereof for securing said float to other means.

2. A floatation device comprising a molded homogeneous solid float of uniform low density substantially ellipsoidal in shape, an elongated endless strap with the mid-portion thereof positioned with opposite sides together and molded therein and through said float in sealed relation following a predetermined curvilinear path therethrough forming a pair of open loops extending from opposite sides thereof for securing said float to other means.

3. The construction recited in claim 2 including said float made from thermally molded foam type polystyrene.

References Cited in the file of this patent

UNITED STATES PATENTS

| | | |
|---|---|---|
| 1,931,406 | Denton | Oct. 17, 1933 |
| 2,753,829 | Agra | July 10, 1956 |

FOREIGN PATENTS

| | | |
|---|---|---|
| 633,928 | France | Oct. 31, 1927 |